United States Patent
Weisner et al.

(10) Patent No.: US 11,174,374 B2
(45) Date of Patent: Nov. 16, 2021

(54) WATER-ENRICHING AND WATER DEPLETING COMPOSITIONS AND METHODS

(71) Applicant: Dober Chemical Corporation, Woodridge, IL (US)

(72) Inventors: Anthony Weisner, Lockport, IL (US); Joseph C. Drozd, Park Ridge, IL (US)

(73) Assignee: Dober Chemical Corporation, Woodridge, IL (US)

( * ) Notice: Subject to any disclaimer, the term of this patent is extended or adjusted under 35 U.S.C. 154(b) by 0 days.

(21) Appl. No.: 16/464,021

(22) PCT Filed: Dec. 1, 2017

(86) PCT No.: PCT/US2017/064154
§ 371 (c)(1),
(2) Date: May 24, 2019

(87) PCT Pub. No.: WO2018/102653
PCT Pub. Date: Jun. 7, 2018

(65) Prior Publication Data
US 2019/0374877 A1 Dec. 12, 2019

Related U.S. Application Data

(60) Provisional application No. 62/428,617, filed on Dec. 1, 2016.

(51) Int. Cl.
| | |
|---|---|
| *C08L 3/14* | (2006.01) |
| *B01D 17/04* | (2006.01) |
| *C10G 33/04* | (2006.01) |
| *C08L 3/04* | (2006.01) |
| *C08L 3/08* | (2006.01) |
| *C08L 3/18* | (2006.01) |
| *C08B 35/04* | (2006.01) |
| *C08B 31/12* | (2006.01) |
| *C08K 3/16* | (2006.01) |
| *C08K 3/22* | (2006.01) |
| *C08K 3/30* | (2006.01) |

(52) U.S. Cl.
CPC .............. *C08L 3/14* (2013.01); *B01D 17/047* (2013.01); *C08B 31/125* (2013.01); *C08B 35/04* (2013.01); *C08L 3/04* (2013.01); *C08L 3/08* (2013.01); *C08L 3/18* (2013.01); *C10G 33/04* (2013.01); *C08K 3/16* (2013.01); *C08K 2003/164* (2013.01); *C08K 2003/168* (2013.01); *C08K 2003/2227* (2013.01); *C08K 2003/2296* (2013.01); *C08K 2003/3045* (2013.01); *C08K 2003/3072* (2013.01)

(58) Field of Classification Search
CPC ...... C08L 3/04; C08L 3/08; C08L 3/14; C08L 3/18; C08B 31/08–14; C08B 34/04; C08B 35/04; C10G 33/00; C10G 33/04; B01D 17/04–048
See application file for complete search history.

(56) References Cited

U.S. PATENT DOCUMENTS

| | | | | |
|---|---|---|---|---|
| 4,088,600 A | * | 5/1978 | Tutein ................. | B01D 17/047 106/206.1 |
| 4,663,159 A | * | 5/1987 | Brode, II ................ | A61Q 5/02 424/70.13 |
| 4,977,252 A | | 12/1990 | Chiu | |
| 5,169,562 A | * | 12/1992 | Mitchell ................ | C10G 33/04 516/149 |
| 5,759,409 A | | 6/1998 | Knauf et al. | |
| 2005/0277768 A1 | * | 12/2005 | Buwalda .............. | B01J 13/0052 536/102 |
| 2016/0032197 A1 | * | 2/2016 | Weisner ................ | C10G 33/04 252/194 |
| 2016/0221847 A1 | | 8/2016 | Kneib et al. | |
| 2016/0319200 A1 | * | 11/2016 | Chun Hwa ........ | B01D 11/0288 |

FOREIGN PATENT DOCUMENTS

| | | | | | |
|---|---|---|---|---|---|
| CA | 2068013 A1 | * | 7/1993 | | |
| CN | 1149505 A | * | 5/1997 | | |
| WO | WO-2014144025 A1 | * | 9/2014 | ............. | C08B 31/00 |
| WO | 2016019214 A1 | | 2/2016 | | |

OTHER PUBLICATIONS

Machine Translation of CN1149505A. May 14, 1997. (Year: 1997).*
International Preliminary Report on Patentability, application No. PCT/US2017/064154, dated Jun. 13, 2019.
Written Opinion of the International Searching Authority, International Application No. PCT/US2017/064154, dated Feb. 28, 2019.

* cited by examiner

*Primary Examiner* — Stephen E Rieth
(74) *Attorney, Agent, or Firm* — Carlos A. Fisher; Stout, Uxa & Buyan, LLP

(57) ABSTRACT

Compositions are disclosed for dewatering mixtures of petroleum and water. The compositions comprise one or more of the following: an unreacted polysaccharide component; and one or both of a polysaccharide component reacted with a hydrophilic component and a polysaccharide component reacted with a hydrophobic component. The compositions may also include viscosifying agents or stabilizers to stabilize the compositions against separation, for example, prior to use. In particularly preferred embodiments the invention is drawn to compositions for breaking an emulsion; such compositions comprising a carbohydrate component containing a cationic starch joined to a hydrophobic moiety, providing the carbohydrate component oil solubility. The composition may optionally comprise one or more additional demulsifier selected from, without limitation, salts (such as a polyaluminum chloride, an aluminum chlorohydrate, an alum, etc.), metal salts (such as iron and zinc salts), dithiocarbamate, tannin, and organic demulsifiers such as poly-DADMAC and similar compounds.

27 Claims, 3 Drawing Sheets

| Examples | VISC | C.D. | % UN | % SO | % CAT | SO/QUAT |
|---|---|---|---|---|---|---|
| 8. | 2058 | 0.70 | 20 | 36 | 44 | 45/55 |
| 9. | 2516 | 0.57 | 20 | 40 | 40 | 50/50 |
| 10. | 3483 | 0.60 | 20 | 44 | 36 | 55/45 |
| 11. | 3033 | 0.69 | 10 | 45 | 45 | 50/50 |
| 12. | 2125 | 0.67 | 30 | 35 | 35 | 50/50 |
| 13. | 1491 | 0.48 | 40 | 30 | 30 | 50/50 |

LEGEND-
VISC = Viscosity
C.D. = Charge Density
% UN = Mole Percent Unreacted Starch
% SO = Mole Percent Starch Reacted With Styrene Oxide
% CAT = Mole Percent Starch Reacted With QUAT®188

| Examples | OO Size | VISC | C.D. | Oil Soluble | % UN | % OO | % CAT |
|---|---|---|---|---|---|---|---|
| 14. | C10 | 2391 | 0.66 | Lowest | 20 | 40 | 40 |
| 15. | C12 | 3100 | 0.66 | ↓ | 20 | 40 | 40 |
| 16. | C14 | 3766 | 0.66 | | 20 | 40 | 40 |
| 17. | C16 | 7458 | 0.61 | Highest | 20 | 40 | 40 |

LEGEND-
OO Size = Aliphatic Chain Length
VISC = Viscosity
C.D. = Charge Density
% UN = Mole Percent Unreacted Starch
% OO = Mole Percent Starch Reacted With Olefin Oxide
% CAT = Mole Percent Starch Reacted With QUAT®188

WATER-ENRICHING AND WATER DEPLETING COMPOSITIONS AND METHODS

FIELD OF THE INVENTION

The present invention is drawn to compositions and methods useful to cause, or aid in, the separation of an aqueous continuous phase from a hydrophobic dispersed phase (as in an oil-in-water, or "regular" emulsion), or a hydrophobic continuous phase from an aqueous dispersed phase (as in a water-in-oil, or "reverse" emulsion). For example, the invention may pertain to compositions and methods used in the petroleum industry for dewatering crude oil, for example, crude petroleum, from the extraction stage of oil, for example, petroleum production. In other examples, the invention may pertain to water treatment compositions and methods.

INVENTION AND BACKGROUND

Petroleum may include only crude oil, but in common usage it includes liquid, gaseous, and solid hydrocarbons. Under surface pressure and temperature conditions, lighter hydrocarbons, such as methane, ethane, propane and butane, occur as gases, while pentane and heavier hydrocarbons are in the form of liquids or solids. However, in an underground oil reservoir the proportions of gas, liquid, and solid depend on subsurface conditions and on the phase diagram of the petroleum mixture.

An oil well produces predominantly crude oil, with some natural gas dissolved in it. Because the pressure is lower at the surface than underground, some of the natural gas will come out of solution when depressurized during extraction and be recovered (or burned), for example, as associated gas or solution gas.

Three conditions are often present for oil reservoirs to form: a source rock rich in hydrocarbon material buried deep enough for subterranean heat to cook it into oil; a porous and permeable reservoir rock for the oil to accumulate in; and a cap rock (seal) or other mechanism that prevents the oil from escaping to the surface. Within these reservoirs, fluids will typically organize themselves like a three-layer cake with a layer of water below the oil layer and a layer of gas above it, although the different layers vary in size between reservoirs. Because most hydrocarbons are less dense than rock or water, they often migrate upward through adjacent rock layers until either reaching the surface or becoming trapped within porous rocks (known as reservoirs) by impermeable rocks above. However, the process is influenced by underground water flows, causing oil to migrate hundreds of kilometers horizontally or even short distances downward before becoming trapped in a reservoir. When hydrocarbons are concentrated in such a trap, an oil field forms, from which the liquid can be extracted by drilling and pumping.

Commonly, wells are drilled into oil reservoirs to extract the crude oil, which will contain some amount of water. "Natural lift" production methods that rely on the natural reservoir pressure to force the oil to the surface are usually sufficient for a while after reservoirs are first tapped. In some reservoirs, such as in the Middle East, the natural pressure is sufficient over a long time. The natural pressure in most reservoirs, however, eventually dissipates. Then the oil must be extracted using "artificial lift" means. Over time, these "primary" methods become less effective and "secondary" production methods may be used. A common secondary method is "waterflood" or injection of additional water into the reservoir to increase pressure and force the oil to the drilled shaft or "wellbore."

Eventually "tertiary" or "enhanced" oil recovery methods may be used to increase the oil's flow characteristics by injecting steam, carbon dioxide, hydraulic fracturing fluids, and/or other chemicals into the reservoir. In the United States, primary production methods account for less than 40 per cent of the oil produced on a daily basis, secondary methods account for about half, and tertiary recovery the remaining 10 per cent. Extracting bitumen from oil/tar sand and oil shale deposits requires mining the sand or shale and heating it in a vessel or retort, or using "in-situ" methods of injecting heated water into the deposit and then pumping out the oil-containing liquid.

Vast quantities of water, in the form of steam, are used to liquefy and extract petroleum from tar sands, an unconventional oil reserve. When oil-eating bacteria biodegrade oil that has escaped to the surface, tar sands, such as the Athabasca oil sands in Canada, can result. Tar sands (more properly termed bituminous sands) are reservoirs of partially biodegraded oil still in the process of escaping and being biodegraded, but they contain so much migrating oil that, although most of it has escaped, vast amounts are still present—often more than can be found in conventional oil reservoirs. Canada and Venezuela have the world's largest deposits of oil sands.

Thus, crude oil from many sources, both conventional and unconventional, contains amounts of water that can vary from a percentage of the extracted petroleum to a multiple of the total volume of extracted petroleum. This water, which is often present in an emulsion with the extracted petroleum, must be separated from the oil before the oil can be further refined and used. When the majority of the liquid is made up of hydrophobic petroleum, an water-in-oil emulsion may result, whereas when the majority of the liquid (the continuous phase) is water or another hydrophilic liquid a "regular" emulsion, such as an oil-in-water emulsion may result.

Various methods exist for dehydrating, or dewatering, crude oil, or reclaiming water contaminated with oil or another non-aqueous liquid phase. Thus, U.S. Reissue Patent No. RE33999 is drawn to a method and apparatus for removing residual water from heavy crude oil. The apparatus comprises a distillation apparatus comprising a casing, an inlet for admitting liquid crude oil into the casing so as to establish a liquid surface in the casing, an outlet passage for discharging dehydrated liquid crude oil from the casing, a heater in the casing for maintaining the liquid oil at a distillation temperature for evaporating water and light hydrocarbons, a vapor outlet for discharging a mixture of water vapor and light hydrocarbons evaporated from the crude oil, a spray device above the surface of the liquid in the casing for spraying incoming crude oil onto and in heat exchange contact with the surface of the heated oil in the casing, whereby water and light hydrocarbon vapors are distilled from incoming crude oil upon contact with the surface of the heated liquid crude oil.

U.S. Pat. No 1,559,036 is drawn to an electrolytic method for demulsifying oil and water emulsions, involving adding a chemical electrolyte to the emulsion, then passing an electrical current through the emulsion to separate water and oil phases.

U.S. Pat. No. 3,453,205 describes heating the crude oil to coalesce and evaporate the water, then skimming the oil into a separate compartment.

These basic methods of heating and/or distilling the water from the petroleum, and of the use of electrical current to resolve the oil-water emulsion (and combinations of these approaches) are still in use.

Additionally, as described by European Patent Publication EP 2231822, chemical methods of demulsifying oil-water emulsions and dewatering crude oil are also used. Dewatering in this fashion can be an expensive step in the process of upgrading crude oil for transportation and/or refining due to the slight differences in specific gravity between the oil and water, the expense of the chemical used, and the need for time to permit the separation to occur. Large separation vessels, for example, have been used to phase separate the water from the oil, with long residence times for the separation to take place.

European Patent Publication EP 0174399 describes the use of an aqueous formulation comprising (i) a demulsifier such as an alkylene oxide alkyl phenol-formaldehyde condensate (e.g., a polyethoxylated nonylphenol-formaldehyde condensate) and (ii) a deoiler to prevent oil entrainment into the aqueous phase, such as a polyol e.g., ethylene glycol or polyethylene glycol having a molecular weight ranging from 106 to 4500.

U.S. Pat. No. 5,989,436 describes a method for dehydrating crude oil wherein an emulsion of water and oil is mixed in a stirring chamber together with a suitable amount of an emulsion breaker. The resulting mixture is subjected to separation in a two-phase separation tank to an oil-rich component and a water-rich component, the oil-rich component is then fed to a dehydrator of a high voltage charge type in which separation to a dehydrated heavy oil and a second water-rich component is effected, the two water-rich component fractions supplied from the two-phase separation tank and the dehydrator are mixed in a pipeline, the mixture thus obtained is admixed with an oil-in-water emulsion breaker and then, fed to a stirring chamber and finally separated to a second oil-containing component and an oil-free water layer in a second separation chamber.

Similarly, emulsion breakers are also effective to separate a disperse oil phase from a continuous aqueous phase; such emulsion breakers may useful, for example, in environmental remediation, such as in the event of an oil spill, when the water phase is desired to be recovered instead of, or in addition to the oil phase. Additionally, such compositions may be useful in wastewater treatment, such as treatment of effluent from manufacturing, laundry, and other processes that produce, or are associated with, a water effluent in which a hydrophobic phase is dispersed. However, it has been generally thought that demulsifying agents must be water soluble, which may make their use more difficult and/or less effective with water-in-oil than with oil-in-water emulsions.

Additional references concerning dewatering methods and compositions include "Chemistry of Styrene Oxide", Shecter et. al., *Ind. Eng. Chem.*, 1957, 49 (7), pp 1107-1109; "Glycidyl Ether Reaction with Alcohols, Phenols, Carboxylic Acids, and Acid Anhydrides", *Ind. Eng. Chem.*, 1956, 48 (1), pp 86-93; and U.S. Pat. Nos. 4,500,735; 4,554,021; 4,741,835; 3,462,283; 6,398,911; 7,157,573; 6,517,678; 4,870,167; and U.S. Publ. No. US2016/0032197 A1.

All patents, patent publications and non-patent publications cited herein are hereby individually incorporated herein by reference. No admission is hereby made that any such reference is prior art to the present invention.

It is therefore advantageous to provide new, straight forward compositions and methods useful for dewatering/ dehydrating crude oil, e.g., petroleum and wherein the same ingredients may be used in different combinations and ratios of such ingredients to easily tailor their use to regular and reverse emulsions.

SUMMARY OF THE INVENTION

The present invention is drawn to dewatering and demulsifying components or compositions and to methods for using such components or compositions. As particularly preferred, the invention relates to dewatering components or compositions capable of separating and/or resolving oil-in-water emulsions and water-in-oil emulsions. In some embodiments such emulsions may comprise water-in-oil emulsions containing crude petroleum oil, and to methods of using such components or compositions to separate and/or resolve such emulsions. In other embodiments such emulsions may comprise oil-in-water emulsions containing petroleum oil or another hydrophobic phase, and to methods of using such components or compositions to separate and/or resolve such emulsions.

The production of oil from underground reservoirs results in crude oil containing varying amounts of water generally in the form of an emulsion, e.g., a water-in-oil emulsion or an oil-in-water emulsion. It is general practice to dehydrate the crude oil by allowing it to stand but oftentimes the dehydration is enhanced by the addition of a demulsifier to break the emulsion into its component phases, thus facilitating physical separation of the crude oil from the water. Following this first dehydration step, the crude oil may be transported to the refinery where it may undergo an initial dewatering procedure to remove residual water and/or be subjected to the process of desalting, i.e. the removal of salts from hydrocarbon crude oil, sometimes employing the action of an electrocoalescer.

Salts in hydrocarbon crude oil are generally dissolved in small droplets of water or brine dispersed throughout the crude. Sodium chloride is the primary salt found in crude oil; other commonly found salts are calcium chloride, magnesium chloride and the sulfates of these three metals. The total salt content may range from substantially zero to several hundred pounds per thousand barrels of crude.

These brine droplets are generally prevented from coalescing and settling by a tough, elastic film at the surface of each droplet. This film is stabilized by natural emulsifiers found in the crude oil, solids, and solid hydrocarbons that concentrate at the droplet surface. A desalting chemical or demulsifier displaces these natural emulsifiers and solids, and weakens the film so the droplets of brine can coalesce when they contact each other.

A new oil field will frequently produce crude oil with negligible water and salt. As production continues, the amount of water produced increases, raising the salt content of the crude. Additional salt contamination often occurs during tanker shipment. An empty tanker takes on sea water as ballast and often uses it to wash the tanks. To minimize pollution, the top, oily layer of ballast water and the washings are segregated in a slop compartment when the ballast water is discharged. Fresh crude is then loaded on top of this slop oil and water. The entire compartment is then offloaded at the refinery.

As earlier inferred, some water and/or brine can be removed, for example, by settling and drawing off the water in the refinery's crude storage tanks. Demulsifiers can increase the rate and amount of settling and can prevent sludge buildup and be used to clean tanks where sludge has already accumulated. Typically, the demulsifier formulation is injected into the turbulent crude flow as it fills the storage tank at a treat rate of from about 10 to 500 ppm. The settled brine is drawn before the crude is charged to the pipestill.

A good or useful dewatering component or composition will efficiently break and separate the emulsion, whether oil-in-water or water-in-oil, into its constituent oil and water phases. The rate of and extent at which such a demulsifier breaks the emulsion will be sufficient to result in an oil with significantly reduced salt content going to a distillation tower. Preferably the water and salt will be substantially removed from the oil.

Similarly, minimal oil will be present in the effluent water which flows from the bottom of the coalescer (i.e., known as oil carryunder). Solids will be water wet so they are similarly removed from the crude. Further the dewatering component should be able to treat crude of having many different compositions and characteristics effectively.

A dewatering component or composition should be sufficiently stable during storage and/or use that stratification or separation of the formulation does not occur during use. Stratification or separation is highly objectionable since it causes a drastic and undesirable reduction of demulsification efficiency. Also highly objectionable for a dewatering component or composition is a tendency to foam, since the presence of foam results in a decrease of effective operating capacity and/or an increase in the stability of the emulsion being treated.

Furthermore, a good dewatering composition should be cost effective.

It is, accordingly, an object of certain aspects of the present invention to providing novel dewatering components or compositions and processes for dewatering, demulsifying, and/or desalting oil-in-water emulsions, water-in-oil emulsions, water contaminated with a hydrophobic phase, and conventional whole crude petroleum oils, including heavy petroleum crudes, bituminous petroleum slurries, heavy petroleum crude fractions, residua, fuel oils and refinery hydrocarbon fractions.

Common dewatering components/demulsifiers include, or are based on, chemistries including:
Acid-catalysed phenol-formaldehyde resins
Base-catalysed phenol-formaldehyde resins
Epoxy resins
Polyamines
quaternized condensate amines
Di-epoxides
Polyols
tannins
aluminum chloride and polyaluminum chloride
diallyldimethylammonium chloride (DADMAC) and homopolymers of DADMAC (poly DADMAC or pDADMAC)

The above-referenced compounds and classes of compounds are often ethoxylated (and/or propoxylated) to provide the desired degree of water/oil solubility, depending on the nature of the particular oil well or petroleum deposit from which the crude oil is extracted. The addition of ethylene oxide moieties increases the water solubility of the demulsifier, propylene oxide moieties tend to decrease the water solubility of the demulsifier compound. The chemical agents are also sometimes blended together; heat is also often used as a method to enhance the separation of the oil and water phases.

In some examples the dewatering/clarifying composition of the present invention a tannin component. Tannins are a family of polyphenolic compounds containing hydroxyl groups and often carboxyl groups; tannins in general tend to form complexes with proteins and other organic compounds and macromolecules. In nature tannins are found in a large number of plant species, including both gymnosperms (such as pines) and angiosperms (such as oaks), molecules called "pseudo tannins" (which may include gallic acid, flavan-3-ols, clorogenic acid) are found in coffee, cacao, and tea. Additionally, synthetic tannins (synthetic polyphenolic compounds) have been made, such as phenol-formaldehyde based resins, particularly those termed "novolacs" having a formaldehyde to phenol ratio of less than one and cross-linked with methylene or dimethylene bridges. The presence of tannins can be tested by the ability to precipitate proteins.

Generally, tannins occur in three major classes, classified by the monomer unit of the tannin. In one class, the hydrolysable tannins, the monomer comprises a gallic acid monomer unit. The second class, the non-hydrolysable (or condensed) tannins, the monomer unit is flavone. Both of the first tannin classes can be extracted from plants. The third tannin class, the phlorotannins, is extracted from brown algae, and comprises a phlorogluconol subunit. Particularly in the flavone-derived tannins, the monomer is polymerized and further hydroxylated in order to yield the relatively high molecular weight polyphenol motif characteristic of tannins. A tannin must generally have at least about 12 hydroxyl groups and at least about five phenyl groups to bind proteins substantially. Unmodified tannins are generally completely water-soluble. Tannins may have molecular weights ranging from about 500 Da to over 20,000 Da.

Although aqueous tannin solutions are generally at least lightly acid, in certain applications in a dewatering/clarifying component the tannins may be present in solution as acidified tannins. For example, commercially available tannin aqueous solutions such as Floquat™ FL 5323 (SNF Inc., Riceboro, Ga.), may comprise acidified tannic substances at a concentration of about 25% to about 35% by weight at a pH of as low as about 2. However, tannins can be modified to comprise cationic charges as well; a commercial product called Floccotan™ comprises amine-modified wattle bark tannins having active amine groups appended thereto to create an amphoteric tannin, depending upon the pH of the solution.

In certain embodiments the dewatering/clarifying composition of the present invention comprises at least one of a polysaccharide component (e.g., comprising a starch having a moiety comprising a positively charged atom) and a tannin.

In some examples the dewatering/clarifying composition comprises polysaccharide component or mixture of polysaccharide components combined with one or more additional demulsifying agent.

In some cases a demulsifier may be a metal salt. Metal demulsifiers include, without limitation, water-soluble salts of multivalent metallic cations from the group consisting of ferrous ion, ferric ion, aluminum ion, cupric ion, zinc ion, manganese ion, calcium, magnesium, and chromic ions.

Aluminum demulsifers may include, without limitation, one or more of aluminum sulfate, aluminum choride, aluminum chlorohydrate, sodium aluminate, polyaluminum chloride, polyaluminum sulfur chloride, polyaluminum silicate chloride, and forms of any of these salts in conjunction with organic polymers.

Iron demulsifers may include, without limitation, one or more of ferric sulfate, ferrous sulfate, ferric chloride, ferric chloride sulfate, polyferric sulfate, and forms of any of these salts in conjunction with organic polymers.

Zinc demulsifers may include zinc zeolytes, zinc sulfate, zinc oxide, zinc chloride and zinc nitrate.

Additional demulsifiers may also include, without limitation, polymeric demulsifiers. Such polymeric demulsifers or derivatives hereof may include, without limitation, activated silica, extracts from seeds of the Nirmali tree (which comprise an anionic, mainly proteinacious, demulsifier). Polyscaccharide demulsifers have been mentioned above and may include natural starches, modified starches, anionic oxidized starches, amine-treated starches and starch derivatives, guar gums, chitosan, and alginates. An advantage of such polymers is that they are biodegradable and virtually toxin free.

Synthetic demulsifiers may include, without limitation, dithiocarbamate; acrylate and polyacrylamide-based compounds; pDADMAC-based quaternary ammonium compounds (including a homopolymer or a copolymer of a vinylic cationic monomer chosen from the group consisting of DADMAC, DMAEM, DMAEA, MAPTAC, AMPIQ, DEAEA, DEAEM, DMAE-acrylamide, DMAEM-acrylamide, DEAE-acrylamide, DEAEM-acrylamide, and their acid and quaternized salts); polyethyleneimine (PEI); other polyamines; and quaternized condensate amines (such as, without limitation, those described in U.S. Pat. Nos. 4,197,350 and 5,750,492).

In conjunction with oil dewatering, large separation tanks, which may comprise heating elements, have been used, and are still used, in conjunction with dewatering/clarifying components to separate and produce the dewatered crude oil from the emulsion for further processing; This can be done either in batch fashion or in a continuous fashion.

In a "continuous feed" operation, crude oil emulsion and dewatering components are fed into the separation tank, and substantially dewatered oil and substantially oil-free water phases are removed from the tank, wherein the rate of delivery of crude oil and dewatering components and the rate of removal of the oil and water phases are essentially in equilibrium. In the traditional "batch" gravity-style dewatering process, the crude oil emulsion and dewatering components are added to the tank and mixed, optionally heated to accelerate the separation process, and permitted to stand and settle until the separation is sufficiently complete that the aqueous phase and the oil phase can be separately removed.

Other methods are sometimes used in conjunction with dewatering components to aid in the crude oil dewatering process. For example, large-scale centrifuge separators can dewater crude oil emulsions containing up to 50% water, such as crude oil extractions on offshore oil platforms, and are said to be capable of producing up to 50,000 barrels of oil per day. The centrifuge may spin with a centrifugal force of up to 5,000×g or more, and permits a continuous feed of crude oil and dewatering components, and continuous production of dewatered oil, while removing water and solids from the crude feed.

Due to the specialized nature of the chemical agents used in many of these chemical dewatering/clarifying components, the use of such components can be costly when these components are used in the volume necessary for the production of large quantities of dewatered oil.

In the present invention, one or more compositions for dewatering or clarifying a mixture of a hydrophobic liquid phase and water, for example, crude oil and water, are provided. In this context, it will be understood that "dewatering" refers to the separation of water and oil or hydrophobic phases from each other. This may occur not only when water is desired to be "removed" from oil, but also when oil or a hydrophobic phase is desired to "removed" from water. Thus, in the present invention, a dewatering composition may be made of similar base components as a water treatment composition, although the base components may be different in their water and oil solubilities depending upon the nature of the samples to be treated, whether the mixture has a water or hydrophobic continuous (more abundant) phase, and the nature and/or amount of any polar components in the sample.

Furthermore, in light of the present disclosure, those of skill in the art will be aware that while many of the examples provided herein concerning treatment of a mixture of petroleum (such as crude oil), the same or similar components may be used to treat and clarify a mixture of a water phase and a hydrophobic liquid phase in order to recover a largely clarified and homogeneous water phase.

In one example, a composition for dewatering or clarifying a mixture including petroleum and water may comprise an unreacted polysaccharide component. Examples of such polysaccharide components include, without limitation, one or more unreacted starches, for example, from corn, potato, wheat, rice, cassava, tapioca and various other tubers and other vegetable sources; starch derivatives, guar gum, guar gum derivatives, other suitable unreacted polysaccharides and mixtures thereof. In some examples two or more polysaccharides may be covalently linked; in other examples all carbohydrate components are separate in the composition.

It will also be understood that starches may differ depending on the nature and amounts of one or more polysaccharide components thereof.

Starches are large polycarbohydrates (polysaccharides) comprising glucose units linked by glycoside bonds. In pure starch, there are two types of molecules, linear and helical amyloses, and amylopectin, which is a branched molecule. These are usually present, depending upon the source, in from about 20% to about 25% amylose and from about 75% to about 80% amylopectin. Starches are generally insoluble in cold water and alcohol. However, some forms of processed "modified" starches may contain different percentages of these constituents. The inventors have discovered that a "waxy" starch comprising about 100% amylopectin has a substantially and surprisingly greater efficacy in the present compositions than an equivalent amount of a starch having 25% amylose and 75% amylopectin.

In one example, the component or composition for dewatering or clarifying a liquid comprising a mixture of petroleum (e.g., crude oil) and water comprises a combination or mixture comprising an unreacted polysaccharide component, e.g., as described herein, and a polysaccharide component reacted with a hydrophilic component.

It will be understood that as used herein the terms "unreacted polysaccharide component", "polysaccharide reacted with a hydrophilic component", and "polysaccharide reacted with a hydrophobic component" may refer to regions of the same polysaccharide molecule. For example, an unreacted polysaccharide component may comprise a region of a polysaccharide molecule that is unreacted with one or more hydrophilic, hydrophobic, and/or amphiphilic reagent.

That is, an unmodified polysaccharide preparation may be reacted with one or more hydrophilic, hydrophobic, and/or amphiphilic reagent, resulting in regions of the polysaccharide which are substituted with a hydrophilic moiety, a hydrophobic moiety, and/or an amphiphilic moiety, and regions which may remain unsubstituted.

In one example, an unmodified polysaccharide preparation may be reacted with one or more hydrophilic reagent, resulting in a polysaccharide in which the hydrophilic component(s) may be present in the dewatering component or composition in an amount effective to increase the water solubility of the dewatering component or composition.

Except in the unlikely case that the polysaccharide reagent has reacted with all reactive sites of the polysaccharide molecule, the resulting polysaccharide molecules would then comprise both unreacted polysaccharide components and a polysaccharide reacted with a hydrophilic component (and now containing a hydrophilic component covalently linked thereto.)

In one example, the component or composition for dewatering or clarifying a liquid comprising a mixture of petroleum (e.g., crude oil) and water comprises a combination or mixture comprising an unreacted polysaccharide component and a polysaccharide reacted with a hydrophobic component. The hydrophobic component may be present in the dewatering component or composition in an amount effective to increase the oil solubility of the dewatering component or composition. For example, a polysaccharide molecule may comprise a degree of substitution with the hydrophobic component great enough effective to increase the oil solubility of the polysaccharide molecule.

In one example, the composition for dewatering or clarifying a liquid comprising a mixture of petroleum (e.g., crude oil) and water comprises a combination or mixture comprising an unreacted polysaccharide component, a polysaccharide component reacted with a hydrophilic component and a polysaccharide component reacted with a hydrophobic component. It will be understood that in certain cases the hydrophilic component and the hydrophobic component may be comprised in a single compound, such as an amphiphilic moiety. In one example, the composition has a sufficient hydrophilic/hydrophobic balance to be effective in use, as an oil dewatering composition, to provide or cause effective crude oil coalescence and rejection of water.

In one example, the polysaccharide component included in the composition for dewatering or clarifying a combination including petroleum (e.g., crude oil) and water set forth herein may include one or more starches, starch derivatives, guar gum, guar gum derivatives, one or more other polysaccharides, and mixtures thereof.

In one example, the present compositions comprise an unreacted polysaccharide component; a polysaccharide component reacted, e.g., substituted, with a hydrophilic component; and a polysaccharide component reacted, e.g., substituted, with a hydrophobic component. Such compositions, for example, when combined with an oil-in-water or water-in-oil emulsion, have been found to have a balanced degree of water solubility and oil solubility to be effective in at least assisting in recovering a largely dewatered oil product and/or a largely clarified water product from the emulsion.

For example, such compositions may have, for example, may be produced or provided to have, a balance of water solubility and hydrophobicity to act or collect at the interface of a liquid biphasic mixture of water and an immiscible second phase, such as an oil, e.g., in a crude oil,/water emulsion, to cause coalescence and separation of at least a portion of the hydrophobic liquid and water in the emulsion. Thus, the present compositions may be useful in obtaining separate oil-rich and water-rich products from an oil/water emulsion, e.g., a dewatered oil product and a clarified water product.

The present compositions may further comprise an effective amount of one or more stabilizers to assist in substantially preventing separation of the components of the present composition, for example, when the present composition is diluted with water and/or subjected to elevated temperatures.

Examples of such stabilizers include, without limitation alginates, cellulose derivatives, dextrins, modified starches, guar derivatives, xanthan gum, mixtures thereof and the like.

The polysaccharide components useful in the present compositions may be a polysaccharide or combination of polysaccharides. Such polysaccharide components include, without limitation, starches, starch derivatives, guar gum, guar gum derivatives and other polysaccharides and derivatives thereof and the like. Such polysaccharide components advantageously are reactable with hydrophilic reagent components and hydrophobic reagent components in accordance with the present invention. In a useful embodiment, at least one polysaccharide component is a starch or starch-derived component. Even more preferably, the starch is a modified starch comprising about 100% amylopectin.

The hydrophilic component may be selected from suitable hydrophilic components. Examples of such hydrophilic components include, without limitation, quaternary ammonium reagents (also known as quats), which confer a positive charge on the molecule with which they react; quats may include, without limitation, hydroxides and halides of tetramethyl ammonium, tetraethyl ammonium, tetrabutyl ammonium, and benzyl trimethyl ammonium and mixtures thereof. One currently preferred hydrophilic component is a 65% (by weight) solution of 1-propanaminium, 3-chloro-2-hydroxy-N,N,N-trimethylchloride sold by Dow Hampshire Chemical Corp. under the tradename Quat 188. However, those of ordinary skill in the art are aware that other commercially available hydrophilic reagent components are readily available and can be used to confer a positive charge, a negative charge, or a polar property upon a polysaccharide in the present invention, provided that such component or components are effective as a hydrophilic component in accordance with the present invention.

The hydrophobic component may be selected from suitable hydrophobic components. Examples of such hydrophobic components include, without limitation, olefin oxides such as, without limitation, styrene oxide, ethylene oxide, polyethylene oxide, and aliphatic olefin oxides having, for example, chain lengths of between 10 to 16 carbons, and mixtures thereof. Other commercially available hydrophobic reagent components can be employed provided that such component or components are effective as a hydrophobic component in accordance with the present invention.

The amphiphilic component or moiety may be selected from suitable amphiphilic reagents. Examples of suitable amphiphilic components include, without limitation, quaternary ammonium agents comprising a hydrophobic substitution (also known as quabs), which have both a hydrophobic moiety and a cationic quaternary ammonium component. One useful amphiphilic component is a 38% (by weight) solution of 3-chloro-2-hydroxypropyl-lauryl-dimethylammonium chloride sold by SKW Quab Chemicals, Inc. under the tradename Quab 342. Additional quabs may include Quab 360 (3-chloro-2-hydroxypropyl-cocoalkyl-dimethylammonium chloride) and Quab 426 (3-chloro-2-hydroxypropyl-stearyl-dimethylammonium chloride), in which the lauryl moiety of Quab 342 is substituted with cocoalkyl and stearyl groups, respectively. A characteristic of these reagents is that they confer a positive charge by virtue of the quaternary ammonium moiety, and a hydrophobic region by virtue of the aliphatic substitution.

In one useful feature of the present invention, the ratio or relative amounts or percentages in the present composition of the unreacted polysaccharide component to that of the polysaccharide component reacted with a hydrophilic component to that of the polysaccharide component reacted with a hydrophilic component is advantageously selected or chosen to provide enhanced results, for example, effective or highly effective dewatering/clarifying of the specific oil/water mixture, e.g., emulsion, being processed. In a particularly preferred example the polysaccharide comprises a starch, such as an unmodified starch or a modified starch enriched in amylopectin to about 100%. In another example the polysaccharide comprises a starch and a second polysaccharide such as a guar component.

In one example, the presently useful compositions typically comprise an unreacted polysaccharide component in a range of about 10 to about 50 mole percent; a polysaccharide component reacted with a hydrophilic component in a range of about 25 to about 45 mole percent; and a polysaccharide component reacted with a hydrophobic component in a range of about 25 to about 45 mole percent. In a particularly preferred example the polysaccharide comprises a starch, such as an unmodified starch or a modified starch enriched in amylopectin to about 100%. In another example the polysaccharide comprises a starch and a second polysaccharide such as a guar component.

In one example, a composition in accordance with the present invention is provided wherein the mole percent of polysaccharide component reacted with a hydrophilic component is within about 20% or within about 10% of the mole % of polysaccharide component reacted with a hydrophobic component present in the composition. In a particularly preferred example the polysaccharide comprises a starch, such as an unmodified starch or a modified starch enriched in amylopectin to about 100%. In another example the polysaccharide comprises a starch and a second polysaccharide such as a guar component.

In one example, a composition in accordance with the present invention is provided wherein the mole percent of polysaccharide component reacted with a hydrophilic component is within about 10% or within about 5% of the mole % of polysaccharide component reacted with a hydrophobic component present in the composition. In a particularly preferred example the polysaccharide comprises a starch, such as an unmodified starch or a modified starch enriched in amylopectin to about 100%. In another example the polysaccharide comprises a starch and a second polysaccharide such as a guar component.

In one example, a composition in accordance with the present invention is provided wherein the mole percent of polysaccharide component reacted with a hydrophilic component is within about 2.5% of the mole % of polysaccharide component reacted with a hydrophobic component present in the composition. In a particularly preferred example the polysaccharide comprises a starch, such as an unmodified starch or a modified starch enriched in amylopectin to about 100%. In another example the polysaccharide comprises a starch and a second polysaccharide such as a guar component.

Methods of dewatering crude petroleum containing an undesirable (an excessive) content of water are provided.

In general, such methods comprise contacting the crude petroleum with a composition as shown and/or described herein at conditions effective to obtain a crude petroleum product having a reduced content of water, and a separated water product having a reduced content of crude petroleum.

Additionally, methods of clarifying a mixture of water and an immiscible hydrophobic liquid phase, said mixture containing an undesirable (an excessive) content of the hydrophobic phase are provided.

In general, such methods comprise contacting the mixture of water and immiscible hydrophobic liquid phase with a composition as shown and/or described herein at conditions effective to obtain a hydrophobic liquid phase having a reduced content of water, and a separated water product having a reduced content of the hydrophobic liquid phase.

The compositions used in such methods may include a starch-based component.

The compositions used in such methods may be selected taking into account the make-up (composition) and ratios of the oil or other liquid hydrophobic phase of the mixture and the amount of water in the composition. The compositions used in such methods may be a starch derived product having a sufficient hydrophilic/hydrophobic balance effective in use to provide for, e.g., cause, crude oil coalescence and rejection of water (from the crude petroleum), or to provide for, e.g., cause the water phase to become clarified and rejection of the liquid hydrophobic phase.

The following non-limiting examples illustrate certain of the aspects and advantages of the present invention.

In these examples, polysaccharide-based compositions are formulated to break reverse emulsions in order to obtain low water-content oil and separated water that can be disposed in an environmentally acceptable manner on agricultural land. For these experiments a starch is used and conjugated with hydrophilic and hydrophobic components in order to optimize the hydrophilic/hydrophobic balance to cause oil coalescence and rejection of low oil content water from the emulsion.

In addition to starch, the following tools were used to balance oil and water solubility and charge. It will be understood that the following compounds are merely representative of compounds having the properties listed below, and may be substituted with compounds, such as those disclosed hereinabove, having similar properties.

| Name | Class | Solubility | Charge | Type |
| --- | --- | --- | --- | --- |
| Quat 188 | hydrophilic | Water soluble | Highly cationic | alkyl |
| Styrene oxide | hydrophobic | Oil soluble | Nonionic | Aromatic |
| Olefin oxides | hydrophobic | Oil soluble | Nonionic | Alkyl |
| Quabs (e.g., 342, 360, 426) | hydrophobic | Less water soluble than Quats | Moderately cationic | Alkyl |

The Figures summarize results obtained from an exemplary and systematic optimization method involving panels of hydrophobic/hydrophilic starches formulated as indicated and tested for efficacy in breaking a particular reverse emulsion in order to obtain low water-content oil and clarified, separated water. It is understood that similar methods to those shown here can be used to optimize emulsion breaker compositions for any hydrophobic phase/water phase emulsion.

DETAILED DESCRIPTION OF THE EXAMPLES

EXAMPLES 1-7

A panel of 7 samples are made comprising industrial acid modified corn starch (about 25% amylose and about 75% amylopectin) to which styrene oxide and the cationic quaternary ammonium reagent Quat® 188 is conjugated in various amounts, ratios and charge densities. The samples are prepared using a protocol similar to that shown in Example 18.

Figure 1:
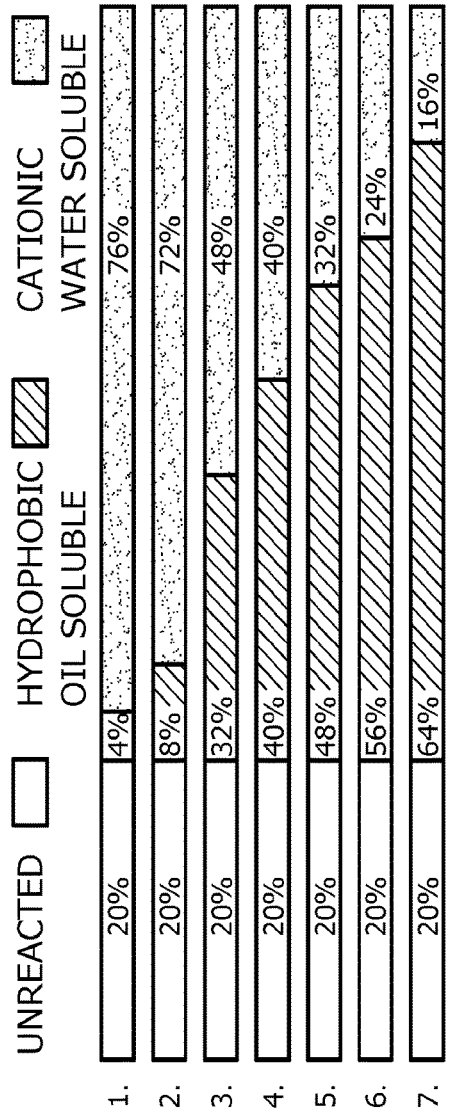
FIG. 1 shows the physical characteristics of a panel of 7 dewatering/clarifying compositions, all of which comprise a starch conjugated with styrene oxide and the cationic quaternary ammonium compound 1-propanaminium, 3-chloro-2-hydroxy-N,N,N-trimethylchloride (Quat® 188) in various amounts, ratios and charge densities.

FIG. 1 shows the characteristics of each of the seven samples, wherein the viscosity (Visc), charge density (C.D.), mole percent unreacted starch (% UN), mole percent starch reacted with the hydrophobic reagent styrene oxide (% SO), and mole percent starch reacted with the hydrophilic reagent Quat® 188 (% CAT) are shown, as well as the ratio of starch reacted with styrene oxide/starch reacted with Quat® 188 (ratio SO/Quat®).

Each sample was tested in an emulsion breaking test against aliquots of the same crude oil sample containing water. For the particular sample provided, Example 4, a dewatering composition having a charge density of 0.62, 20% unreacted starch, and 40% each of starch reacted with styrene oxide and Quat® 188 was found to be the most effective at breaking the emulsion and clarifying the water phase.

EXAMPLES 8-13

A second panel of 6 samples are made using Example 4 as a starting point for further refinement of an optimal dewatering composition for breaking the crude oil/water sample used in FIG. 1.

Figure 2:
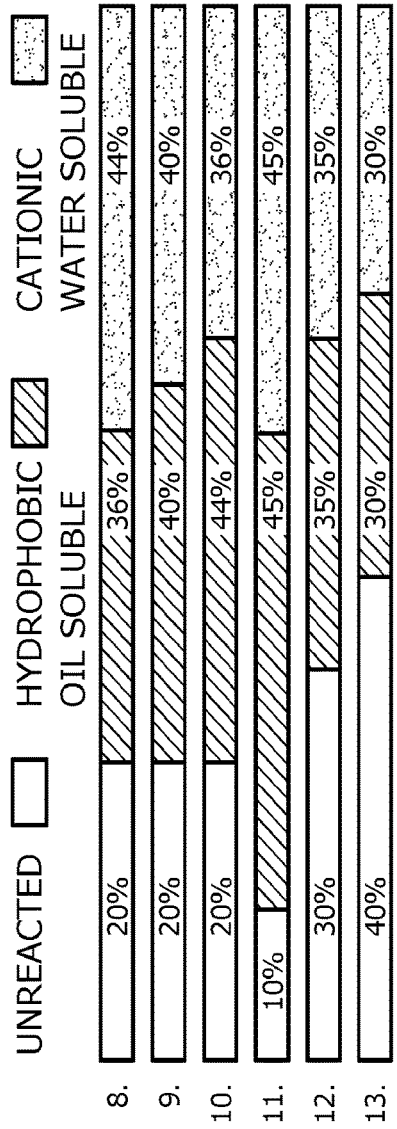
FIG. 2 shows the physical characteristics of a panel of 6 dewatering/clarifying compositions derived from the composition (Example 4) in FIG. 1 that was the most effective in breaking a particular reverse emulsion. The derivative compounds differed from each other (and from Example 4 of FIG. 1) within a narrower range of styrene oxide and Quat® 188 concentrations, ratios and charge densities than the compositions of FIG. 1, and varied the mole percent of unreacted starch as well.
Figure 3:
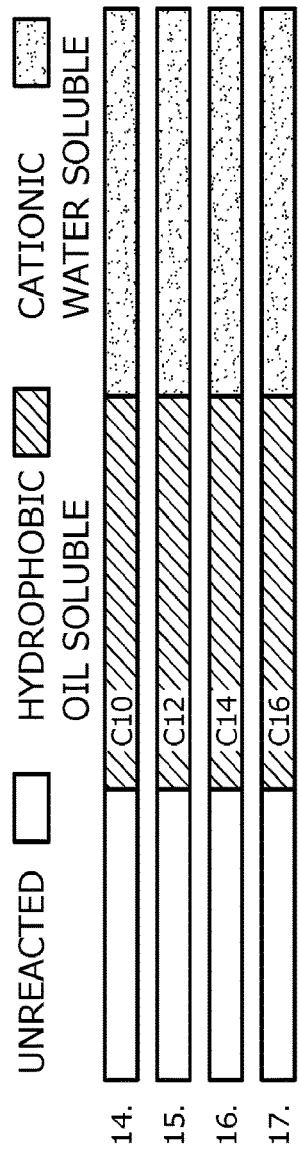
FIG. 3 shows physical characteristics of 4 dewatering/clarifying compositions derived from the composition (Example 4) in FIG. 1 that was the most effective in breaking a particular reverse emulsion. In these compositions styrene oxide was replaced by olefin oxides of varying aliphatic chain length.

In this panel Example 9 is a duplicate of Example 4; as shown in FIG. 2, the remaining samples differed in the mole percentages of starch reacted with styrene oxide (from mol % to 45 mol %) and Quat® 188 (from 30 mol % to 45 mol %), the ratios of the hydrophilic and hydrophobic components, and in the mole percent of unreacted starch (from 10 mol % to 40 mol %). The methods of making these samples was essentially as described in Example 18, but adjusted as necessary to account for the different concentrations and ratios of the hydrophobic and hydrophilic components.

Each sample was tested in the same emulsion breaking test described in Example 1-7, against the same crude oil sample containing water. In this case, Example 12, a dewatering composition having a charge density of 0.67, 30% unreacted starch, and 35% each of starch reacted with styrene oxide and Quat® 188 (i.e., a 50:50 ratio) was found to be the most effective at breaking the emulsion and clarifying the water phase. This is the same compound whose synthesis is detailed in Example 18.

EXAMPLES 14-17

In a third panel, a set of samples based on Examples 4 and 9 were altered to substitute aliphatic olefin oxides of increasing chain length (C10, C12, C14 and C16) for styrene oxide to determine the effect on oil solubility and performance of the aliphatic chain length of the hydrophobic component. In some cases it may be useful for the dewatering composition not to contain styrene oxide, which may linger in the environment.

EXAMPLE 18

81.1 grams of industrial acid modified corn starch (about 25% amylose and about 75% amylopectin) (from Cargill, Inc.) was slurried up in 134 ml of water in a 500 ml flask equipped with a mechanical stirrer and a temperature controller and mixed at room temperature until uniform. 20 grams of 50% sodium hydroxide was then added to the mixture and the temperature was increased to 95° F. and held for one hour.

18.5 grams of styrene oxide (obtained from Sigma Aldrich Co.) was then added to the mixture which was mixed for an additional 30 minutes. 44.6 grams of Quat® 188 (65% (by weight) solution of 3-chloro-2-hydroxypropyltrimethylammonium chloride from Dow Hampshire Chemical Corp. was then added slowly to the mixture and the temperature was increased to 115° F. and held for 6 hours. The charge density of the mixture was then determined. 52 ml of water was then added and the resulting mixture was neutralized to pH 7.1 with 9.5 grams of concentrated hydrochloric acid.

The mixture had the following properties:
Appearance—Semi-transparent yellow-brown liquid
Charge density—0.74 meq/gm, before addition of water
Viscosity—2841 cps
DS=degree of substitution, theoretical
DS total—0.70
DSQ188—0.35
DSstyrene oxide—0.35

The reaction product can also be described by the ratio of unreacted starch to starch reacted with Q188 (hydrophilic component (water solubilizing agent)) to starch reacted with styrene oxide (hydrophobic component (oil solubilizing agent)). In this example it was calculated that the starch was 30% unreacted; 35% of the starch reacted with Q188, to impart water solubility; and 35% of the starch reacted with styrene oxide, to impart oil solubility.

The best or optimum composition, for example, having the best or optimum emulsion breaking properties for a particular crude oil to be dewatered, is determined by adjusting the ratio of the degree of substitution and/or the ratio of unreacted starch (polysaccharide) to starch reacted with oil solubilizing agent to starch reacted with water solubilizing agent with a given crude oil and comparing the results obtained.

The product noted above (in which 30% by weight of the starch was unreacted, 35% by weight of the starch was reacted with Q188; and 35% of the starch was reacted with styrene oxide) was diluted to 50% with water and tested. The resulting composition gave good water/oil separation in the emulsion breaking test. Residual water in the separated oil was acceptable.

Products made at different ratios of unreacted starch to starch reacted with Q188 and to starch reacted with styrene oxide will work as oil dewatering/water clarifying agents to varying degrees, depending on the nature of the oil or water sample.

EXAMPLE 19

In this case the starch is conjugated to guar gum to determine whether the addition of a second polyssachharide aids in the demulsification of the crude oil sample. 392.9 grams of starch (same type of starch as recited in Example 18) was slurried up in 659 ml of water in a 2 liter flask equipped with a mechanical stirrer and a temperature controller and was mixed until uniform. 31.2 grams of a mixture of 25% by weight guar gum in propylene glycol was added while mixing rapidly. Mixing was continued for one hour. 99.1 grams of an aqueous solution of 50 weight percent sodium hydroxide was then added and the temperature was increased to 95° F. and mixed for one hour. 91 grams of styrene oxide was then added and mixed for 30 minutes. 220 grams of Quat® 188 was then added slowly and the temperature was increased to 135° F. and held for 6 hours. 258 ml of water was then added and the product was neutralized to pH 7.5 with 47.8 g of concentrated hydrochloric acid.

The product had the following properties:
Appearance—Semi-transparent yellow-brown liquid
Charge density—0.58 meq/gm, before addition of water
Viscosity—1640 cps
Polysaccharide(PS)=starch+guar gum
Ratio of unreacted polysaccharide/polysaccharide reacted with Quat® 188/polysaccharide reacted with styrene oxide was 30/35/35
DS=degree of substitution, theoretical
DStotal—0.70
DSQ188—0.35—polysaccharide reacted with Q188—35%
DSstyrene oxide—0.35—polysaccharide reacted with styrene oxide—35%

The product was diluted to 50% with water and tested. The diluted product gave good water/oil separation in the emulsion breaking test. Samples made with different ratios worked to varying degrees. The water phase obtained with the guar gum was clearer than with an otherwise identical dewatering composition lacking conjugated guar gum.

EXAMPLE 20

In this example, the dewatering/clarifying composition is made without styrene oxide, by using the amphophilic component Quab® 342. This compound confers somewhat less of a cationic charge to the conjugated starch than does Quat® 188, but also possesses an aliphatic side chain, conferring oil solubility. Quat® 188 is also used to increase the cationic charge density.

66.8 grams of starch (same starch as recited in Example 18) was slurried up in 110 ml of water in a 500 ml flask equipped with a mechanical stirrer and a temperature controller and mixed until uniform. 22.3 grams of 50wt % sodium hydroxide aqueous solution was then added and the temperature was increased to 95° F. and mixed for one hour. 3.2 grams of 50 weight percent sodium hydroxide in water solution was added, followed by 78.7 grams of Quat® 188 and 16.5 grams Quab 342.

Quab 342 is a 38% solution of 3-chloro-2-hydroxypropyl-lauryl-dimethylammonium chloride from SKW QUAB Chemicals, Inc. Quab 342 is a amphiphilic reagent containing a hydrophobic component and a hydrophilic component in the same molecule. It will be understood that other amphilphilic reagents are available and may be used, such as Quab® 151, Quab® 360, Quab® 426 and the like.

The temperature was increased to 130° F. and held for 6 hours. 150 ml of water was then added. The product was neutralized to pH 7 with 2.2 g of concentrated hydrochloric acid.

The product had the following properties:
Appearance—Semi-transparent yellow-brown liquid
Charge density—0.65
Viscosity—12880 cps
Ratio of unreacted starch/starch reacted with Quat® 188/starch reacted with Quab 342—20/75/5
DS=degree of substitution, theoretical
DStotal—0.70 Unreacted starch)—30%
DSQ188—0.35 Starch reacted with Q188—35%
DSQ342—0.35 Starch reacted with Q343—35%

The product was diluted to 50% with water and tested. The diluted product gave good water/oil separation in the emulsion breaking test. Samples made with different ratios worked to varying degrees.

EXAMPLE 21

65.1 grams of industrial acid modified corn starch (as recited in Example 1) was slurried up in 110 ml of water in a 500 ml flask equipped with a mechanical stirrer and a temperature controller and mixed until uniform. Then, 6.8 grams of a mixture of 25% guar gum in propylene glycol was added while mixing rapidly. Mixing was continued for one hour. 22.3 grams of 50% by weight sodium hydroxide in water was then added and the temperature was increased to 95° F. and mixed for one hour. 7.1 grams of 50% sodium hydroxide in water was added, followed by 93.4 grams Quat® 188 and 9.9 g Quab® 342. The temperature was increased to 130° F. and held for 6 hours. The product was neutralized to pH 7 with 2.6 g of concentrated hydrochloric acid.

The product had the following properties:
Appearance—Semi-transparent yellow-brown liquid
Charge density—1.23
Viscosity—13640 cps
Ratio of unreacted polysaccharide/Quat® 188/Quab 342—8/89/3
DS=degree of substitution
DStotal—0.92 Unreacted polysaccharide—8%
DSQ188—0.89 polysaccharide reacted with Q188—89%
DSQ342—0.03 polysaccharide reacted with Q342—3%

The product was diluted to 50% with water and tested. It gave good water/oil separation in the emulsion breaking test. Samples made with different ratios worked to varying degrees. The water phase was clearer than obtained without guar gum.

When diluted with water the mixtures of the type shown in Examples 1-4 can separate, especially at elevated temperatures.

Various substances may be added to improve flow or prevent freezing. Such substances include, without limitation, alcohols, glycols and the like and combinations thereof.

In addition, the products obtained in accordance with the examples have been found to be able to be stabilized against separation by the addition of viscosifying agents. Such agents may, without limitation, include one or more of the following: alginates, carboxymethyl cellulose, dextrins, modified starches, guar gum, hydroxyproyl guar, hydroxyethyl cellulose, xanthan gums.

The use of viscosifying agents (stabilizers) is an important aspect of the present invention in that such agents can be used so that the products can be produced at a location remote from the location at which such products are used. Thus, the products need not be produced at each individual place where the crude oil is to be dewatered.

In certain applications, and for use with different oil or water samples, stabilizers such as one or more antioxidants, chelating agents, coupling agents, density modifiers, dispersants, emulsifiers, solvents and surfactants, or mixtures thereof, may be useful as part of the dewatering/clarifying compositions.

The following Examples 22-25 illustrate the use and effectiveness of certain of the viscosifying agents.

EXAMPLE 22

Product from Example 18—50.0% (by wt.)
Water—50.0% (by wt.)
Separates after standing at 135° F. for 1 week
Product from Example 18—50.0% (by wt.)
Water—49.2% (by wt.)
Dextrin—0.8% (by wt.)—viscosfying agent
No separation at 135° F. after 4 weeks
Viscosity—158 cps
Dextrin from Tate and Lyle, Stadex 128

EXAMPLE 23

Product from Example 19—50% (by wt.)
Water—50%
Separates after standing at 135° F. for 1 week
Product from Example 19—50% (by wt.)
Water—49.6% (by wt.)
Sodium carboxymethylcellulose (CMC)—0.4%
No separation at 135° F.
Viscosity—552 cps
Sodium carboxycellulose, Aqualon CMC 7MF from Ashland

EXAMPLE 24

Product from Example 21—30.0% (by wt.)
Water—70% (by wt.)
Separates after standing at 135° F. for 1 week
Product from Example 21—30.0% (by wt.)
Water—69.6% (by wt.)
Wel-Zan XG—0.4% (by wt.)
No separation at 135° F.
Viscosity—1696 cps Examples of viscosifying agents or stabilizers include, without limitation, alginates, cellulose derivatives, dextrins, modified starches, guar derivatives, xanthan gum, mixtures thereof and the like.

EXAMPLE 25

Product from Example 24—50%-75% (by wt.)
Aluminum chlorhydrate, 25%-50% (by wt.)

This product was tested as an oil/water emulsion breaker. In these tests, this product provided good water/oil separation.

EXAMPLE 26

It will be understood that the compositions of the present invention may be used in conjunction with additional demulsifiers, salts and the like in a final product. In choosing an effective, or the most effective, product for use in dewatering or clarifying a crude oil or water sample of interest, a sample of may be tested with a number of products having compositions within the scope of this invention. Such testing can be conducted expeditiously and provide a basis for identifying the most effective and efficient product for the sample of interest.

It is also important to note that certain products in accordance with the present invention have been found to be effective in dewatering a relatively large number of crude oils. Thus, these certain products may be given priority in testing when seeking to identify a product in accordance with the present invention that is effective, e.g., highly effective, in dewatering a given crude oil.

Non-limiting examples of dewatering/water clarifying compositions of the present invention are shown below.

| Product | Formula | Weight % |
| --- | --- | --- |
| A | GFT 5013 | 20% |
|   | ACS 2070 | 80% |
| B | GFT 5045 | 50% |
|   | DelPac XG | 50% |
| C | GFT 5013 | 50% |
|   | DelPac XG | 50% |
| D | GFT 5100 | 60% |
|   | Floquat FL 5323 | 40% |
| E | GFT 5100 |   |
| F | GFT 5013 |   |
| G | GFT 5045 |   |

Where:
GFT 5013=48.5 wt % water; 42.4 wt % modified corn starch (100% amylopectin) substituted with Quat® 188; 9.1 wt % NaCl.
GFT 5100=78.2 wt % water; 19.3 wt % modified corn starch (100% amylopectin) substituted with Quat® 188; 2.5 wt % NaCl.
GFT 5045=58.7 wt % water; 34.8 wt % modified corn starch (100% amylopectin) substituted with Quat® 188 and Quab® 342; 6.5 wt % NaCl.
ACS 2070=polyaluminum chloride solution (Aluminum Chemical Specialties, LLC) 11 wt % aluminum, 70% basicity, specific gravity 1.3.
DelPac XG=aluminum chlorohydrate solution (USALCO, LLC) Al2O3 24%, basicity 83%, specific gravity 1.3.
Floquat FL 5323=30% by weight acidified tannin substances (SNF, Inc.)

Products may contain from about 1% to 100% of a cationic starch as disclosed herein either containing or lacking an additional hydrophobic component. Some such products may comprise 1% to 100% of a cationic starch in combination with 99% to 1% of a metal salt solution. Such products may be used as is, or may be blended with other ingredients before use. The products will be useful to remove water from an oil phase, remove water from an oil phase, and/or clarify a water phase.

The foregoing examples are simply for the purpose of illustrating various compositions incorporating elements disclosed in the present specification, which shall be interpreted to include any and all figures, charts, tables, descriptions, data, and other attachments filed herewith.

To the extent that a plurality of inventions may be disclosed herein, any such invention shall be understood to have disclosed herein alone, in combination with other features or inventions disclosed herein, or lacking any feature or features not explicitly disclosed as essential for that invention. For example, the inventions described in this specification can be practiced within elements of, or in combination with, other any features, elements, methods or structures described herein unless inconsistent with the specification, taken as a whole. Additionally, features illustrated herein as being present in a particular example are intended, in other examples of the present invention, to be explicitly lacking from the invention, or combinable with features described elsewhere in this patent application, in a manner not otherwise illustrated in this patent application or present in that particular example, unless inconsistent with the specification, taken as a whole. The scope of the invention shall be determined solely by the language of the claims.

Thus, the various descriptions of the invention provided herein illustrate presently preferred examples of the invention; however, it will be understood that the invention is not limited to the examples provided, or to the specific configurations and relation of elements unless the claims specifically indicate otherwise. Based upon the present disclosure a person of ordinary skill in the art will immediately conceive of other alternatives to the specific examples given, such that the present disclosure will be understood to provide a full written description of each of such alternatives as if each had been specifically described.

Claim terms shall be intrinsically defined not only by a specific definition in the specification, but also with reference to the Figures as understood by a person of ordinary skill in the art in light of the present disclosure.

Every publication and patent document cited herein is each hereby individually incorporated by reference in its entirety for all purposes to the same extent as if each were so individually denoted.

What is claimed is:

1. A composition for separating a hydrophobic phase from a water phase in a mixture comprising said hydrophobic phase and said water phase, said composition comprising a carbohydrate component containing a starch substituted with a cationic substituent, a hydrophobic substituent and an amphiphilic substituent, and
   a demulsifier selected from: a tannin; a water-soluble metal salt; an acrylate polymer; an acrylamide polymer; a polyacrylamide; a polymer comprising a homopolymer or copolymer of diallyldimethylammonium chloride (DADMAC) or an acid or quaternized salt thereof; polyethyleneimine, a quaternized condensate amine, a dithiocarbamate, and mixtures of two or more of these;
   in which the hydrophobic substituent is derived from a reagent selected from the group consisting of styrene oxide, ethylene oxide, polyethylene oxide, and aliphatic olefin oxides having chain lengths of between 10 to 16 carbons.

2. The composition of claim 1 wherein the mole percentage of said starch roacted with a hydrophilic substituent is within about 20% of the mole percentage of said starch roacted with said hydrophobic substituent.

3. The composition of claim 1 wherein the mole percentage of said starch roacted with a hydrophilic substituent is within about 10% of the mole percentage of said starch roacted with said hydrophobic substituent.

4. The composition of claim 3 wherein the carbohydrate component comprises said starch and at least one additional polysaccharide.

5. The composition of claim 1 wherein the carbohydrate component comprises said starch and at least one additional polysaccharide.

6. The composition of claim 1 wherein the cationic substituent is derived from a quaternary ammonium reagent.

7. The composition of claim 6 wherein the cationic substituent is derived from a quaternary ammonium reagent selected from 3-chloro-2-hydroxypropyltrimethylammonium chloride, tetraethyl ammonium hydroxide, tetrabutyl ammonium hydroxide, and benzyl trimethyl ammonium hydroxide, a tetramethyl ammonium halide, a tetraethyl ammonium halide, a tetrabutyl ammonium halide, a benzyl trimethyl ammonium halide, and mixtures of 2 or more of these reagents.

8. The composition of claim 7 wherein the amphiphilic substituent is derived from a quaternary ammonium reagent.

9. The composition of claim 8 wherein the amphiphilic substituent is derived from a quaternary ammonium reagent selected from 3-chloro-2-hydroxypropyl -lauryl-dimethyl-ammonium chloride; 3-chloro-2-hydroxypropyl-cocoalkyl-dimethylammonium chloride and 3-chloro-2-hydroxypropyl-stearyl-dimethylammonium chloride.

10. The composition of claim 7 wherein an unreacted polysaccharide component of said starch comprises about 100% amylopectin.

11. The composition of claim 10 wherein the amphiphilic substituent is derived from a quaternary ammonium reagent selected from 3-chloro-2-hydroxypropyl-lauryl-dimethyl-ammonium chloride; 3 chloro-2-hydroxypropyl-cocoalkyl-dimethylammonium chloride, and 3-chloro-2-hydroxypropyl-stearyl-dimethylammonium chloride.

12. The composition of claim 1 wherein the amphiphilic substituent is derived from a quaternary ammonium reagent.

13. The composition of claim 12 wherein the amphiphilic substituent is derived from a quaternary ammonium reagent selected from 3-chloro-2-hydroxypropyl -lauryl-dimethyl-ammonium chloride; 3-chloro-2-hydroxypropyl-cocoalkyl-dimethylammonium chloride and 3-chloro-2-hydroxypropyl-stearyl-dimethylammonium chloride.

14. The composition of claim 1 wherein the hydrophobic substituent is derived from an aliphatic olefin oxide having chain lengths of between 10 to 16 carbons.

15. The composition of claim 1 wherein said carbohydrate component further comprises an alginate, a cellulose derivative, a dextrin, a guar, a xanthan, or mixtures of two or more of these.

16. The composition of claim 15 comprising the water soluble metal salt, wherein the water soluble metal salt is selected from an aluminum sulfate, an aluminum chloride, a aluminum chlorohydrate, a sodium aluminate, a polyaluminum chloride, a polyaluminum sulfur chloride, a polyaluminum silicate chloride, a ferric sulfate, a ferrous sulfate, a ferric chloride, a ferric chloride sulfate, a polyferric sulfate, a zinc zeolyte, a zinc sulfate, a zinc oxide, a zinc chloride and a zinc nitrate.

17. A composition for dewatering a mixture of a hydrophobic phase and water comprising the composition of claim 1 a and an effective amount of one or more viscosifying agents or stabilizers to prevent or delay separation of the components of the composition.

18. The composition of claim 17 wherein the one or more viscosifying agents is selected from the group consisting of one or more alginates, cellulose derivatives, dextrins, modified starches, guar derivatives, xanthan gum, mixtures of two or more of these.

19. A liquid composition comprising a carbohydrate component comprising:
   water,
   a starch substituted with a cationic substituent, a hydrophobic substituent and an amphiphilic substituent, and
   a demulsifier selected from: a tannin; a water-soluble metal salt; an acrylate polymer; an acrylamide polymer; a polyacrylamide; a polymer comprising a homopolymer or copolymer of diallyldimethylammonium chloride (DADMAC) or an acid or quaternized salt thereof; polyethyleneimine, a quaternized condensate amine, a dithiocarbamate, and mixtures of two or more of these;

in which the hydrophobic substituent is derived from a reagent selected from the group consisting of styrene oxide, ethylene oxide, polyethylene oxide, and aliphatic olefin oxides having chain lengths of between 10 to 16 carbons.

20. The composition of claim 19 having a balance of water solubility and oil solubility causing said composition to collect at a water-oil interface of an oil/water emulsion when added thereto, thereby resulting in to cause coalescence and separation of at least a portion of the oil and water in the emulsion.

21. The composition of claim 19 which further comprises an effective amount of one or more stabilizers sufficient to substantially prevent or delay separation of the components of the composition as compared to an otherwise identical composition lacking said one or more stabilizers; said one or more stabilizers being selected from: an alginate, a cellulose derivative, a dextrin, a guar, a xanthan gum, and mixtures of 2 or more of these.

22. The composition of claim 19 in which the demulsifier comprises one or more water-soluble metal salt in which a cationic ion is selected from: ferrous ion, ferric ion, aluminum ion, cupric ion, zinc ion, manganese ion, calcium ion, magnesium ion, chromic ion, and mixtures of two or more of these ions.

23. The composition of claim 22 in which said water soluble metal salt is selected from the group consisting of: an aluminum sulfate, an aluminum chloride, an aluminum chlorohydrate, a sodium aluminate, a polyaluminum chloride, a polyaluminum sulfur chloride, a polyaluminum silicate chloride, a ferric sulfate, a ferrous sulfate, a ferric chloride, a ferric chloride sulfate, a polyferric sulfate, a zinc zeolyte, a zinc sulfate, a zinc oxide, a zinc chloride and a zinc nitrate.

24. The composition of claim 19, wherein said demulsifier comprises a dithiocarbamate.

25. The composition of claim 19 wherein the cationic substituent is derived from a quaternary ammonium reagent selected from 3-chloro-2-hydroxypropyltrimethylammonium chloride, tetraethyl ammonium hydroxide, tetrabutyl ammonium hydroxide, and benzyl trimethyl ammonium hydroxide, a tetramethyl ammonium halide, a tetraethyl ammonium halide, a tetrabutyl ammonium halide, a benzyl trimethyl ammonium halide, and mixtures of two or more of these.

26. The composition of claim 19 wherein the amphiphilic substituent is derived from a quaternary ammonium reagent selected from the group consisting of 3-chloro-2-hydroxypropyl-lauryl-dimethylammonium chloride; 3-chloro-2-hydroxypropyl-cocoalkyl-dimethylammonium chloride and 3-chloro-2-hydroxypropyl-stearyl-dimethylammonium chloride.

27. A method of separating a mixture of a hydrophobic fluid phase and an aqueous fluid phase comprising contacting the mixture with the composition of claim 1 under conditions effective to result in said hydrophobic fluid phase having a reduced content of water, and a separated aqueous fluid phase having a reduced content of the hydrophobic fluid phase.

* * * * *